US010318282B2

(12) United States Patent
Thippavajjula et al.

(10) Patent No.: US 10,318,282 B2
(45) Date of Patent: Jun. 11, 2019

(54) METHOD AND SYSTEM FOR MONITORING QUALITY CONTROL ACTIVITIES DURING DEVELOPMENT OF A SOFTWARE APPLICATION

(71) Applicant: Tata Consultancy Services Limited, Mumbai (IN)

(72) Inventors: Venkata Sri Krishna Suman Thippavajjula, Siruseri (IN); Vijayakumar Rajagopal, Siruseri (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/590,015

(22) Filed: Jan. 6, 2015

(65) Prior Publication Data

US 2016/0196136 A1    Jul. 7, 2016

(51) Int. Cl.
*G06F 8/70* (2018.01)
*G06F 11/36* (2006.01)
*G06Q 10/06* (2012.01)

(52) U.S. Cl.
CPC ............ *G06F 8/70* (2013.01); *G06F 11/3668* (2013.01); *G06F 11/3688* (2013.01); *G06Q 10/06* (2013.01); *G06Q 10/06395* (2013.01); *G06Q 10/063118* (2013.01)

(58) Field of Classification Search
CPC .... G06F 11/3688; G06F 11/3668; G06F 8/70; G06Q 10/06; G06Q 10/063118; G06Q 10/06395
See application file for complete search history.

(56) References Cited

U.S. PATENT DOCUMENTS

| 7,080,351 | B1* | 7/2006 | Kirkpatrick | G06Q 10/06 717/102 |
| 7,139,732 | B1* | 11/2006 | Desenberg | G06Q 10/06395 705/35 |
| 8,464,205 | B2 | 6/2013 | Chaar et al. | |
| 8,726,226 | B2 | 5/2014 | Groves et al. | |
| 2004/0133880 | A1* | 7/2004 | Paternostro | G06F 11/3688 717/124 |
| 2009/0276281 | A1* | 11/2009 | Foltz | G06Q 10/06 705/7.14 |

(Continued)

OTHER PUBLICATIONS

V. Basili et al., "Tailoring the Software Process to Project Goals and Environments", pp. 345-357, Mar. 2006.

*Primary Examiner* — Jacob D Dascomb
(74) *Attorney, Agent, or Firm* — Finnegan, Henderson, Farabow, Garrett & Dunner LLP

(57) ABSTRACT

Disclosed is a method and system for monitoring one or more quality control activities to be performed during development of a software application. The system may receive information related to sub-applications. The sub-application may correspond to a module of the software application. The system may create groups of quality control activities. The quality control activities may need to be performed during different stages of development of the software application. The system may allow assigning quality control managers related to the quality control activities. The quality control manager may thus monitor the quality control activities to be performed for a successful integration of the software application.

7 Claims, 10 Drawing Sheets

(56) References Cited

U.S. PATENT DOCUMENTS

2011/0093833 A1* 4/2011 Kierans .................. G06Q 10/06
                                                    717/101
2011/0219359 A1* 9/2011 Gupta ....................... G06F 9/44
                                                    717/124
2014/0082584 A1* 3/2014 Kim ......................... G06F 8/20
                                                    717/104

* cited by examiner

METHOD AND SYSTEM FOR MONITORING QUALITY CONTROL ACTIVITIES DURING DEVELOPMENT OF A SOFTWARE APPLICATION

TECHNICAL FIELD

The present subject matter described herein, in general, relates to a system and a method for monitoring quality control activities to be performed during development of a software application.

BACKGROUND

A software application may comprise a plurality of software modules. Each software module may be associated with a functionality of the software application. Conventionally, each software module may be independently developed by respective development teams. After the development, the plurality of software modules may be integrated to derive the software application. Upon integration, the plurality of software modules may interact with each other for communication of data in order to provide an end-to-end functionality by the software application.

In order to provide the end-to-end functionality, the plurality of software modules may interact with each other by invoking one or more services by the plurality of software modules. It is to be understood that the one or more services may be invoked based on function calls or Application Programming Interfaces (APIs). Since the plurality of software modules are programmed in the software application, service gaps may arise due to non-integration of the plurality of software modules.

It has been observed that while integrating the plurality of software modules, integration issues may arise due to an imperfect integration of the one or more software modules of the plurality of software modules. This is because a programmer may not have adequate test data for carrying out integration testing of the software application. The programmer may also face connectivity issues due to a middleware of the software application.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for monitoring one or more quality control activities to be performed during development of a software application and the concepts are further described below in the detailed description. This summary is not intended to identify essential features of the claimed subject matter nor is it intended for use in detecting or limiting the scope of the claimed subject matter.

In one implementation, a system for monitoring one or more quality control activities to be performed during development of a software application is disclosed. In one aspect, the system may comprise a processor and a memory coupled to the processor capable of executing programmed instructions. The programmed instructions may comprise instructions to receive information pertaining to one or more sub-applications. The one or more sub-applications may be integrated to derive the software application. Further, each sub-application may correspond to a module of the software application. The programmed instructions may further comprise instructions to create one or more groups. Each group may comprise of the one or more quality control activities to be performed during different stages of development of the software application. The group of the one or more quality control activities may be referred as an initiative. A group of the one or more groups may be related to a sub-application of the one or more sub-applications. Further, each quality control activity may be associated with a start date and an end date. The programmed instructions may comprise instructions to assign a quality control manager corresponding to each group thereby facilitating the quality control manager to monitor the one or more quality control activities to be performed during development of the software application.

In another implementation, a method for monitoring one or more quality control activities to be performed during development of a software application is disclosed. In one aspect, the method may comprise receiving information pertaining to one or more sub-applications. The one or more sub-applications may be integrated to derive the software application, and each sub-application may correspond to a module of the software application. The method may further comprise enabling a user to create one or more groups. Each group may comprise of the one or more quality control activities to be performed during different stages of development of the software application. The group of the one or more quality control activities may be referred as an initiative. A group of the one or more groups may be related to a sub-application of the one or more sub-applications. Each quality control activity may be associated with a start date and an end date. The method may further comprise enabling the user to assign a quality control manager corresponding to each group, thereby facilitating the quality control manager to monitor the one or more quality control activities to be performed during development of the software application. In one aspect, the aforementioned method for monitoring one or more quality control activities to be performed during development of a software application is performed by a processor using programmed instructions stored in a memory.

In yet another implementation, non-transitory computer readable medium embodying a program executable in a computing device for monitoring one or more quality control activities to be performed during development of a software application is disclosed. The program may comprise program code for receiving information pertaining to one or more sub-applications. The one or more sub-applications may be integrated to derive the software application. Each sub-application may correspond to a module of the software application. The program may further comprise a program code for enabling a user to create one or more groups. Each group may comprise of the one or more quality control activities to be performed during different stages of development of the software application. The group of the one or more quality control activities may be referred as an initiative. A group of the one or more groups may be related to a sub-application of the one or more sub-applications. Each quality control activity may be associated with a start date and an end date. The program may further comprise a program code for enabling the user to assign a quality control manager corresponding to each group, thereby facilitating the quality control manager to monitor the one or more quality control activities to be performed during development of the software application.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure. However, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

FIG. 3 illustrates a user interface (UI) for enabling a user to modify information belonging to a sub-application created in the system.

FIG. 4 illustrates a user interface (UI) for enabling a user to create a group of the one or more quality control activities (initiatives) and to assign a quality control manager for the group of quality control activities, in the system.

FIG. 5 illustrates a user interface (UI) for enabling a user to modify details related to the one or more quality control activities associated with an initiative and to modify the sub-application impacted by the initiative, into the system.

FIG. 8 illustrates a user interface (UI) showing a detailed breakdown of the one or more quality control activities to be performed during phases of development of the software application.

FIG. 9 illustrates a user interface (UI) for computing an effectiveness score for the initiative.

DETAILED DESCRIPTION

Figure 1:
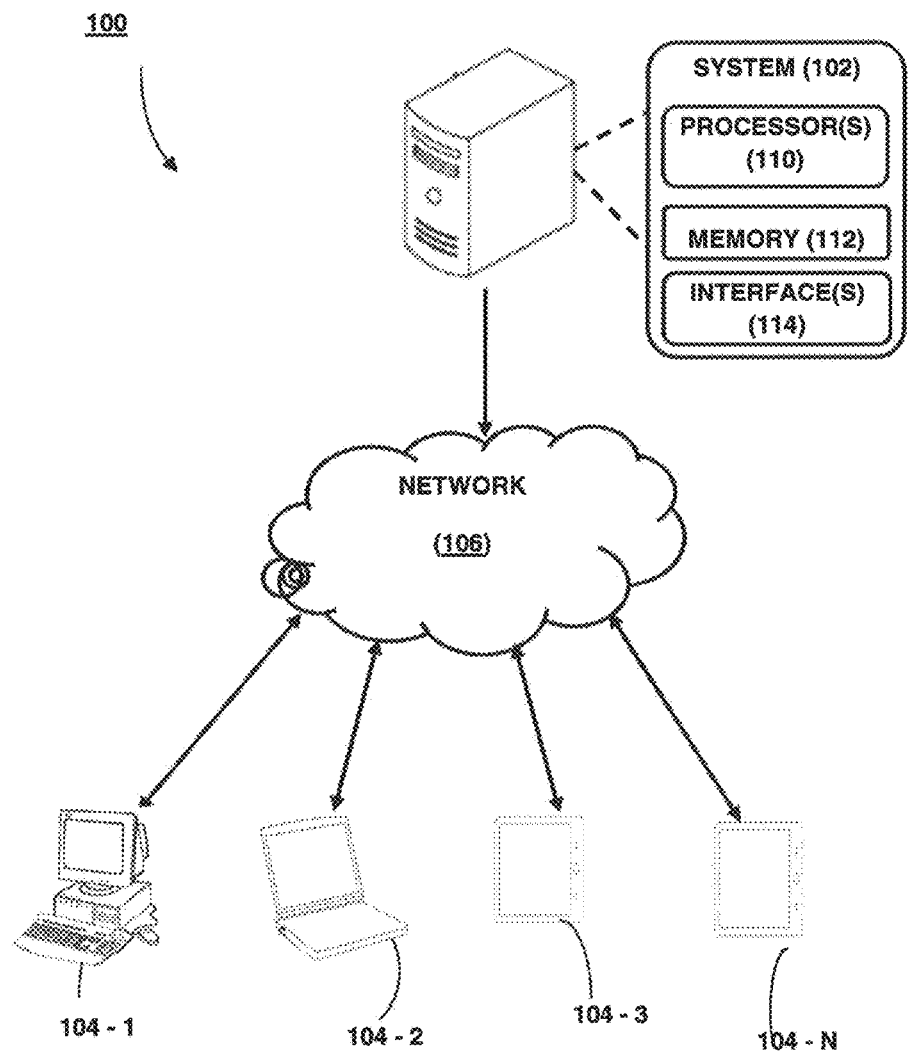
FIG. 1 illustrates a network implementation for monitoring one or more quality control activities to be performed during development of a software application is shown, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

System(s) and method(s) for monitoring one or more quality control activities to be performed during development of a software application are described. The software application may comprise one or more sub-applications. In one embodiment, the one or more sub-applications may also be identified as modules of the software application. The modules are program codes written in a specific programming language. Examples of the programming language may include but not be limited to C, C++, C#, Java™, .NET™, Structured Query Language (SQL™), Extensible Markup Language (XML™), Hypertext Preprocessor (PHP™), Perl™, Python™, and Ruby™. It is to be understood that each sub-application may be developed independently by respective development teams. After the development, the one or more sub-applications may be integrated to derive the software application.

In order to facilitate integration of the one or more sub-applications, initially, the system may receive information related to a sub-application of the one or more sub-applications. Subsequently, the system may enable a user to create one or more groups. In one aspect, a group, of the one or more groups, may be associated with at least one of the one or more sub-applications. In one embodiment, each group may comprise the one or more quality control activities to be performed for integrating the one or more sub-applications. Examples of the one or more quality control activities may include but not be limited to sharing an integration document, arranging mapping sessions, identifying end-to-end test scenarios, identifying data for integration testing, tracking integration defects, setting up testing sessions, and monitoring integration issues in production stage. In one aspect, each quality control activity may be associated with a start date and an end date.

Further, while creating the one or more groups, the system may concurrently enable the user to assign a quality control manager corresponding to each group. In one aspect, the quality control manager may be selected based on a technical expertise of the quality control manager and a technical requirement associated to the software application. For example, a financial application, related to banking sector, may need to be developed using C# and Java™. The system may then identify an employee having a knowledge and expertise of C# and Java™ as a quality control manager. Further, the system may set preferences for identifying the quality control manager. The system may set the preferences based on number of years of experience of the employee, number of projects handled by the employee, and programming language certifications available with the employee.

The quality control manager selected by the system may track a status and a progress of each quality control activity. The quality control manager may track the status and the progress based on the start date and the end date of each quality control activity. Further, the one or more quality control activities may be performed during different phases of development of the software application. The different phases of development may comprise a design phase, a build phase, a test phase, and a control phase.

Once the one or more quality control activities are performed, the one or more sub-applications may be integrated to develop the software application. It is to be understood that while integrating, the quality control manager may observe integration issues. In one embodiment, to overcome the integration issues, the quality control manager may organize mapping sessions and review meetings between service providers and service consumers related to the software application. The quality control manager may organize the mapping sessions and the review meetings for addressing the integration issues. The quality control manager may address the integration issues by identifying the mapping errors and providing a technical remedy for resolving the integration issue.

After resolving the integration issues, a signoff may be required from at least one stakeholder. For an example, the stakeholder may be one of a project manager, a team lead, a customer, a software developer, a software tester and the like. The signoff may indicate a completion of the one or more quality control activities. Further, the system may compute an effectiveness score related to each sub-application. The system may compute the effectiveness score based on a defect count, total effort, and a baseline value. In one aspect, the defect count may indicate a number of integration issues handled by the quality control manager. The total effort may indicate an effort applied by the quality control manager for addressing the integration issues related to the group of one or more quality control activities. The baseline value may indicate a threshold value related to each sub-application. Further, the baseline value may be set differently for each sub-application. In one embodiment, the effectiveness score may be computed as below:

$$\text{Effectiveness score}=(\text{Defect count}/\text{Total effort})*100 \qquad (1)$$

The effectiveness score may then be compared with the baseline value. In a situation, the effectiveness score may have a value greater than the baseline value. The situation may indicate that expectations related to the sub-application are not fulfilled. Similarly, converse of the situation is also applicable.

Thus, in the above described manner, the system may facilitate the quality control manager to monitor the one or more quality control activities to be performed during development of the software application.

While aspects of described system and method for monitoring one or more quality control activities to be performed during development of a software application may be implemented in any number of different computing systems, environments, and/or configurations, the embodiments are described in the context of the following exemplary system.

Referring now to FIG. 1, a network implementation 100 of a system 102 for monitoring one or more quality control activities to be performed during development of a software application is disclosed. In one aspect, the system 102 may receive information related to one or more sub-applications. Each sub-application may be identified as module of the software application. Further, the system 102 may enable a user to create one or more groups. A group of the one or more groups may comprise the one or more quality control activities to be performed across multiple stages of development of the software application. The group may be related to a sub-application of the one or more sub-applications. Further, while creating the one or more groups, the system 102 may simultaneously enable the user to assign a quality control manager corresponding to each group. The user may assign the quality control manager based on an expertise of the quality control manager. The quality control manager may monitor at least one quality control activity based on a start date and an end date of the at least one quality control activity.

Although the present subject matter is explained considering that the system 102 is implemented on a server, It is to be understood that the system 102 may also be implemented in a variety of computing systems, such as a laptop computer, a desktop computer, a notebook, a workstation, a mainframe computer, a server, a network server, a cloud-based computing environment and the like. In one implementation, the system 102 may comprise the cloud-based computing environment in which the user may operate individual computing systems configured to execute remotely located applications. It will be understood that the system 102 may be accessed by multiple users through one or more user devices 104-1, 104-2 . . . 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The system 102 is illustrated in accordance with an embodiment of the present disclosure. In one embodiment, the system 102 may include at least one processor 110, an input/output (I/O) interface 114, and a memory 112. The at least one processor 110 may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interface 114 may include a variety of software and hardware interfaces, for example, a web interface, a graphical user interface, and the like. The I/O interface 114 may allow the system 102 to interact with the user directly or through the user devices 104 also hereinafter referred to as client devices 104. Further, the I/O interface 114 may enable the system 102 to communicate with other computing devices, such as web servers and external data servers (not shown). The I/O interface 114 can facilitate multiple communications within a wide variety of networks and protocol types, including wired networks, for example, LAN, cable, etc., and wireless networks, such as WLAN, cellular, or satellite. The I/O interface 114 may include one or more ports for connecting a number of devices to one another or to another server.

The memory 112 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, at first, a user may use the client devices 104 to access the system 102 via the I/O interface 114. The user may register him using the I/O interface 114 in order to use the system 102. In one aspect, the user may accesses the I/O interface 114 of the system 102 for monitoring one or more quality control activities to be performed during development of a software application. The method for monitoring the one or more quality control activities will be described henceforth.

Figure 2:
FIG. 2 illustrates a user interface (UI) for enabling a user to create a sub-application in the system.

Referring now to FIG. 2, the system 102 may allow a user to create one or more sub-applications into the system 102. A sub-application of the one or more sub-applications may signify a module of a software application. It is to be understood that the one or more sub-applications may be programmed in a programming language by a development team of a service provider organization. Examples of the programming language may include, but not be limited to, C, C++, C#, Java™, .NET™, Structured Query Language (SQL™) Extensible Markup Language (XML™), Hypertext Preprocessor (PHP™), Perl™, Python™ and Ruby™. Upon development, the one or more sub-applications may be integrated for deriving the software application.

In one embodiment, the one or more sub-applications may hereinafter be referred as one or more applications and the sub-application may hereinafter referred to as an application, as illustrated from FIG. 2. The system 102 may accept data in data fields from the user in order to create the application. For example, the data fields may comprise a name of the application, name of an IT manager, a business unit, and an e-mail distribution group. In one aspect, the name of the application may be used to identify the application, amongst the one or more applications, by the system 102. In one aspect, the IT manager may be a person responsible for managing activities related to the application. Example of the activities may include, but not be limited to, designing software architecture of the software application, source code of the application, and testing the application. The e-mail distribution group may comprise e-mail addresses of at least one unit related to the application. The at least one unit may comprise a group of persons related to designing, development, testing, and monitoring the application. The system 102 may communicate at least one unit when any activity related to the application occurs. For an example, the unit may be communicated through a Short Message Service (SMS) or an e-mail.

Figure 3:
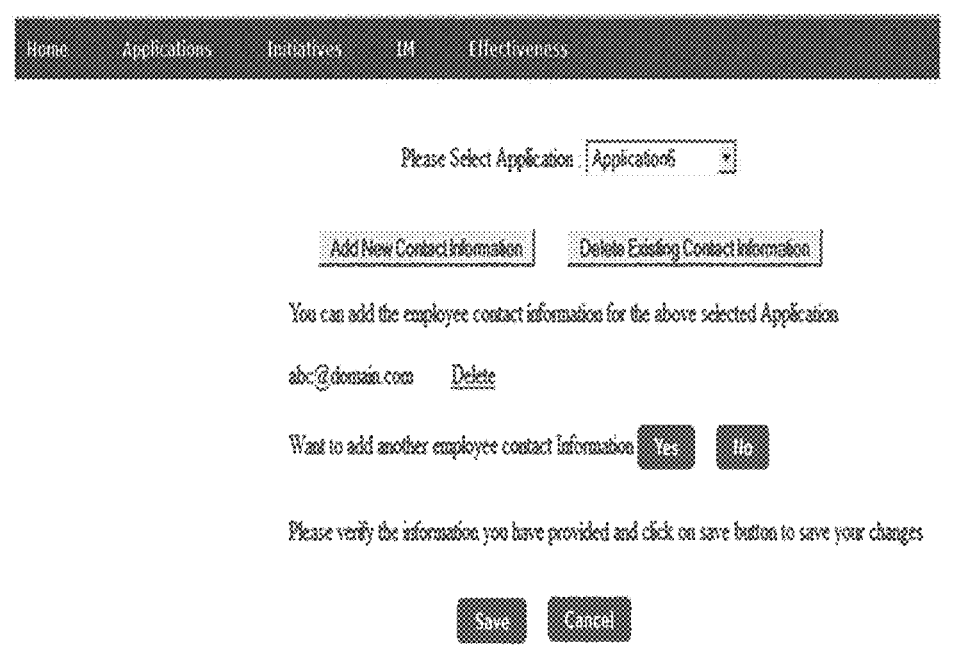

Post creating the application, the system 102 may allow the user to modify information belonging to the application, as illustrated using FIG. 3. The application may be stored in the memory 112 of the system 102. In order to modify the information, the system 102 may enable the user to select the application whose information is to be modified. Based on the selection, the system 102 retrieves the information pertaining to the application from the memory 112. Upon retrieving, the system may further enable the user to update and/or modify the information retrieved. For example, consider employee information of an employee is stored in the memory 112. In order to modify, the employee information may be retrieved from the memory 112. Upon retrieval of the employee information, the system 102 may enable the user to manage details of an employee associated with the application by performing at least one of an add operation, a modify operation, and a delete operation.

Figure 4:
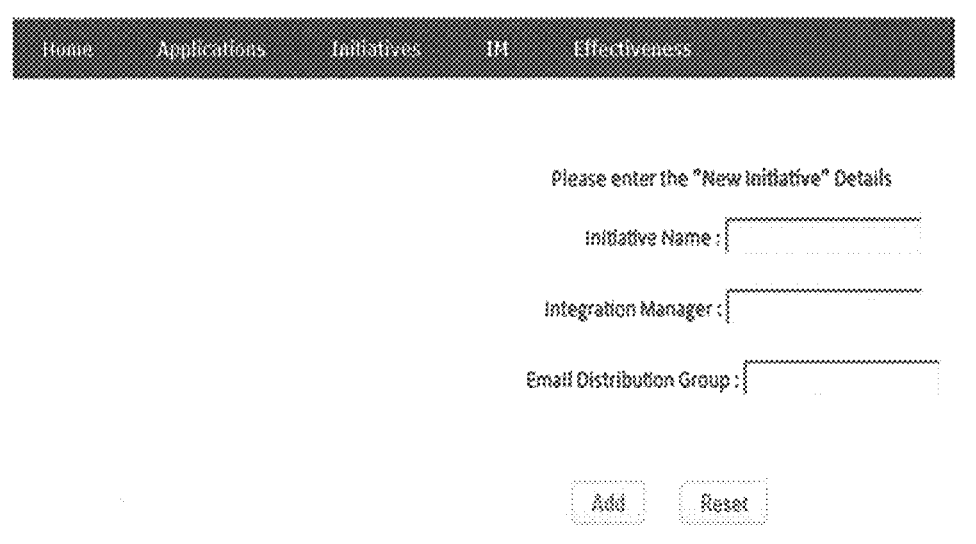

Subsequent to modification of the application, the system 102 may allow the user to create a group of the one or more quality control activities as illustrated from FIG. 4. The group of the one or more quality control activities may be referred as an initiative in the FIG. 4. In order to identify the initiative amongst one or more initiatives, the system 102 may receive a name of the initiative name from the user. Since the initiative may be associated with the one or more quality control activities, each quality control activity is to be monitored for a successful integration of the one or more applications. In one aspect, the quality control activity may be monitored by assigning an integration manager for the initiative. The system 102 may allow the user to assign a quality control manager while creating the initiatives.

In one embodiment, the system 102 may allow the user to assign the quality control manager to the initiatives. Further, the system 102 may also assign the quality control manager to the initiatives based on a technical expertise of the quality control manager and a technical requirement associated with the software application. In order to assign the quality control manager, the system 102 may find a match for the technical requirement by searching into an employee database stored in the memory 112. The employee database may comprise information related to technical knowledge of employees. For example, consider the software application related to a financial and banking domain which is developed in C# and Java™ The system 102 may then assign an employee having a technical knowledge of C# and Java™ as the quality control manager. Further, the system 102 may set preferences for identifying the quality control manager. In one embodiment, the quality control manager may also be referred as an Integration Manager (IM) as illustrated in the FIG. 4.

Figure 5:
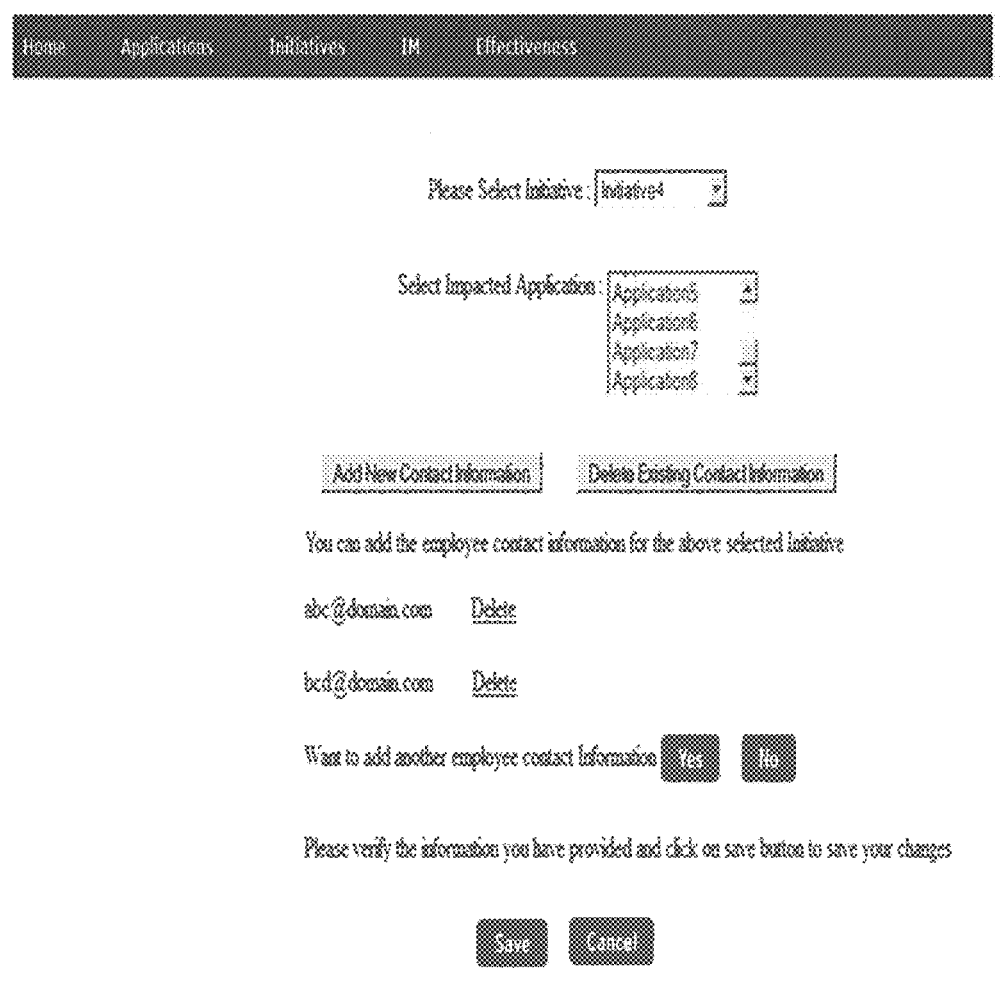

Subsequently, the system 102 may communicate with at least a service unit, responsible for handling the initiative, for sharing information related to the initiative. In order to communicate with the service unit, the system 102 may accept an e-mail distribution group related to the service unit. The e-mail distribution group may comprise an e-mail address of at least one individual of the service unit. The unit may be communicated in case any activity related to the initiative is being performed. For an example, the unit may be communicated through e-mail, SMS or any other communication technique known in the art. Once the initiative is created, the system 102 may facilitate a user to modify details related to the one or more quality control activities associated with the initiative as illustrated in FIG. 5. In order to modify the initiative, the system 102 may enable the user to select the initiative amongst one or more initiatives stored in the memory 112. It is to be understood that the one or more quality control activities of the initiative may impact the one or more applications. Further, the system 102 may enable the user to select at least one application, impacted by the initiative, amongst the one or more applications stored in the memory 112. The system 102 may allow the user to modify contact information of an employee related to the initiative selected by the user. For example, the system 102 may allow the user to add/delete the contact information of the employee.

Figure 6:
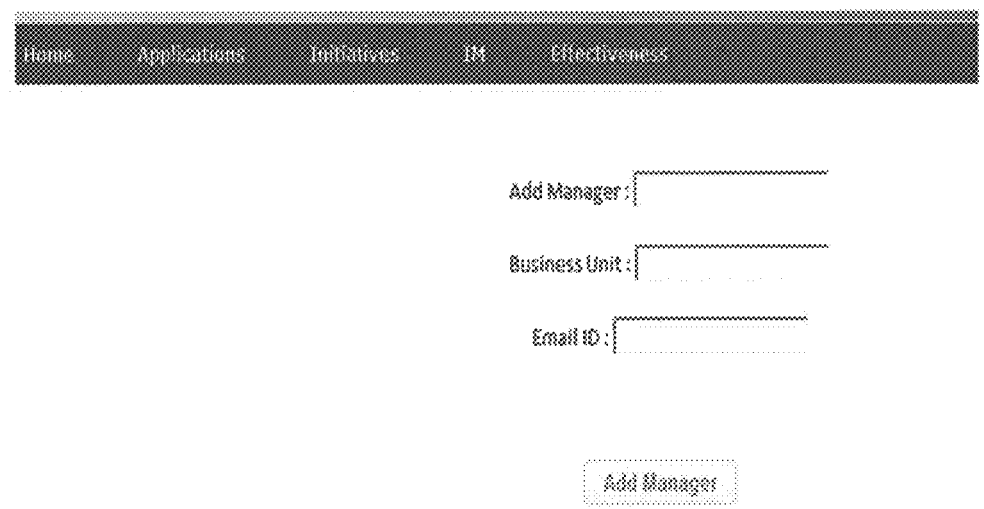
FIG. 6 illustrates a user interface (UI) for enabling a user to assign a new quality control manager for at least an initiative.

In order to monitor the one or more quality control activities, a new quality control manager may be assigned for the one or more initiatives. For example, the new quality control manager may be assigned while the quality control managers previously assigned to the one or more initiatives are temporarily unavailable or not in a position to monitor the one or more quality control activities associated with the one or more initiatives. In one embodiment, the new quality control manager may be assigned by enabling the user to provide details pertaining to the new quality control manager in the respective data fields as illustrated in FIG. 6. For example, the system 102 may receive name of the new quality control manager, business unit of the new quality control manager, and e-mail address of the new quality control manager. In one embodiment, the new quality control manager may also be referred as the Integration Manager (IM) as illustrated in the FIG. 6.

Figure 7:
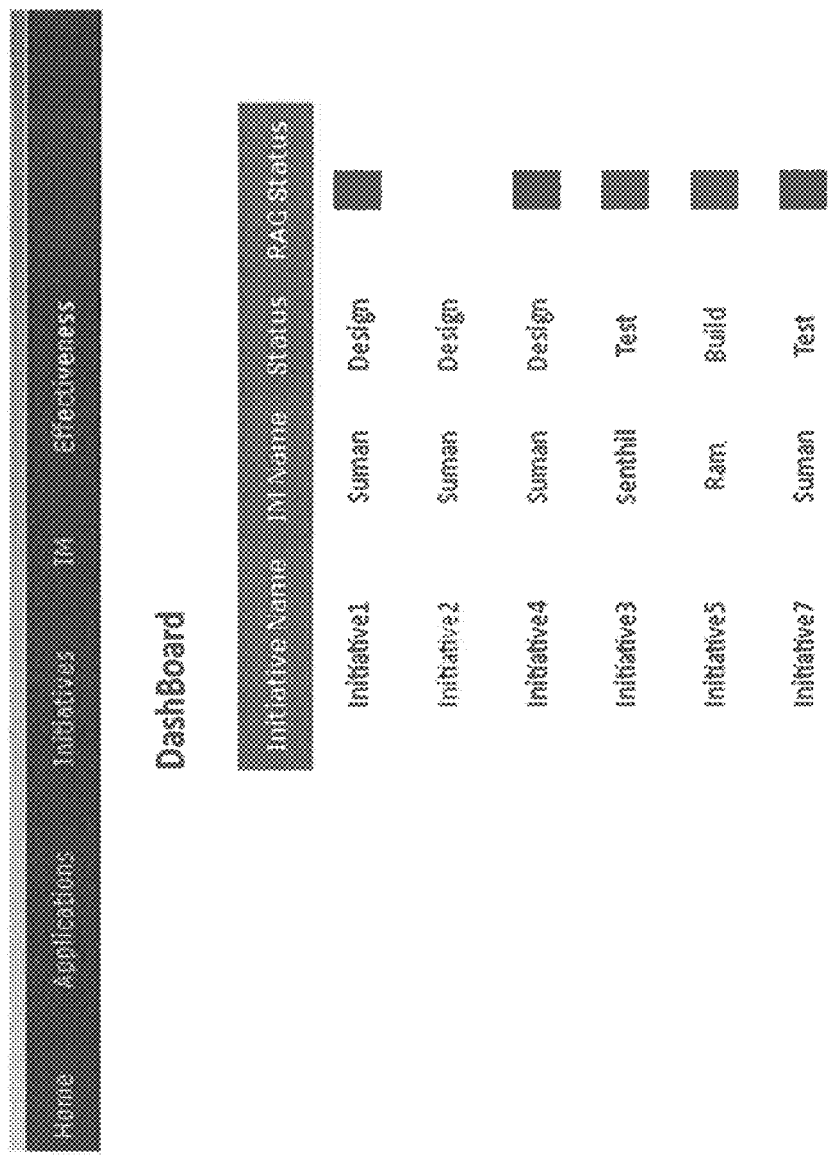
FIG. 7 illustrates a user interface (UI) showing a home page to the user.

In one embodiment, the system 102 may present a home page to the user, as illustrated in FIG. 7. The home page may represent initiative name of the one or more initiatives created by the user. The system 102 may also present, to the user, name of quality control managers assigned for the one or more initiatives for monitoring the one or more quality control activities performed for each initiative. The home page provided by the system 102 may also represent, to the user, a status (hereinafter referred to as phase in the description) of the initiative. Examples of the phase may include, but not be limited to, a design phase, a build phase, a test phase, and a control phase. In one aspect, the phase indicates a stage of development of the software application. Each phase may be associated with at least an initiative.

In order to understand the one or more quality control activities corresponding to each phase, considering an example, the one or more quality control activities to be performed in the design phase may include sharing an integration document, arranging mapping sessions between a service provider and a service consumer, and performing an end to end mapping of project requirements. Further, the one or more quality control activities to be performed in the build phase may include identifying end to end test scenario's, reviewing end to end test scenarios, and identifying data for integration testing. Furthermore, the one or more quality control activities to be performed in the test phase may include tracking end to end integration testing, tracking the integration defects, setting up testing sessions, and reviewing rollout strategy and identifying gaps in the project requirements. Furthermore, the one or more quality control activities to be performed in the control phase may include monitoring integration issues in production, performing root cause analysis for production defects, and identifying best practices for handling the integration issues.

Figure 8:
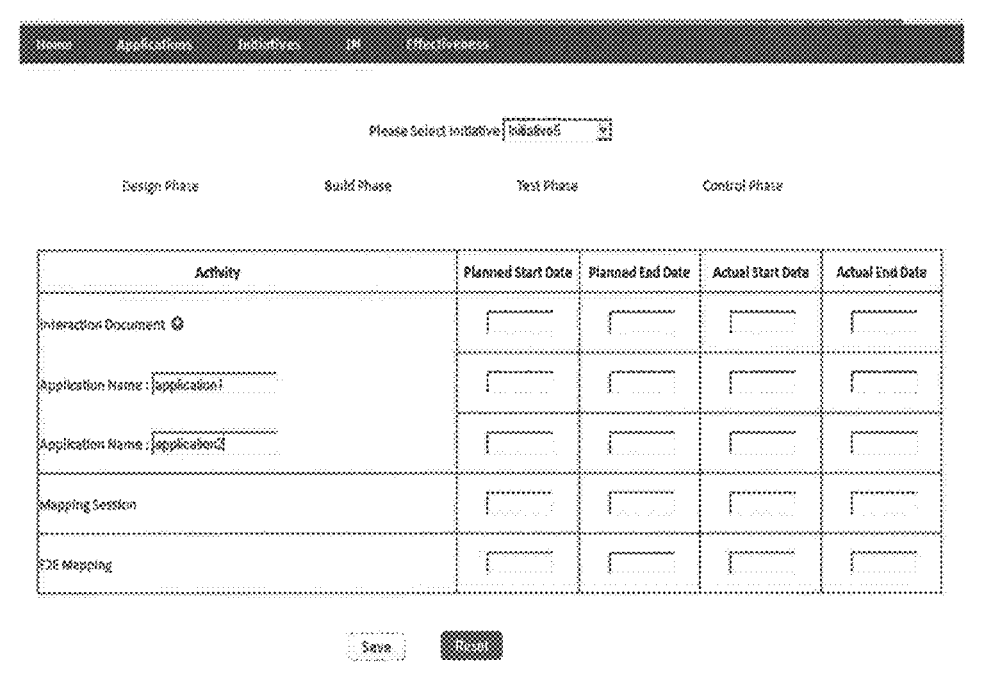

Referring to FIG. 8, a detailed breakdown of the one or more quality control activities to be performed during phases of development of the software application is explained. The one or more quality control activities to be performed during the design phase, the build phase, the test phase, and the control phase may be monitored by the quality control managers. In one aspect, the quality control managers may monitor the one or more quality control activities by using dates and timestamps associated with the one or more quality control activities. For example, the dates associated with the one or more quality control activities may comprise a planned start date, a planned end date, an actual start date, and an actual end date. Based on the planned start date, the planned end date, the actual start date, and the actual end date, the quality control managers may plan milestones for finishing the one or more quality control activities. The quality control manager may also identify a delay occurred in performing the one or more quality control activities by using the planned start date, the planned end date, the actual start date, and the actual end date.

In one embodiment, the system 102 may fetch the one or more quality control activities, from the memory 112, based on parameters stored in the memory 112. The parameters for selecting the one or more quality control activities may be pre-defined by the user. The system 102 may present the one or more quality control activities to the user. The one or more quality control activities may be related to the one or more initiatives. Further, the one or more quality control activities may be related to the phases of development of the software application. For an initiative, the system 102 may further allow the user to add new quality control activities, based on a scope of the initiative.

In one embodiment, the quality control manager may observe integration issues while monitoring the one or more quality control activities. The integration issues may arise while integrating the one or more applications of the software application. In one embodiment, to overcome the integration issues, the quality control manager may organize mapping sessions and review meetings between service providers and service consumers related to the software application. The quality control manager may organize the mapping sessions and the review meetings for addressing the integration issues. The quality control manager may address the integration issues by identifying the mapping errors and providing a technical remedy for resolving the integration issues.

Post addressing the integration issues, the system 102 may receive a signoff from at least one stakeholder. The signoff may indicate a completion of the one or more quality control activities. Further, a stakeholder may be an approver of the one or more quality control activities. For example, the approver may be a service provider, a service consumer, program development head, a program testing head, or a program architect.

In one embodiment, upon receiving the signoff, the system 102 may allow the user to compute effectiveness scores. The effectiveness scores may be related to the initiatives. At first, the system 102 may allow the user to select at least one initiative from the one or more initiatives. The initiatives, as defined by the user, may be stored in the memory 112 of the system 102. Subsequently, the system 102 may receive a defect count as an input from the user. For an example, the defect count may be a number of integration issues handled. Further, the system 102 may allow the user to provide a total effort as the input. The total effort may correspond to an effort applied by the quality control manager for addressing the integration issues related to the initiatives. Further, the system 102 may allow the user to provide a baseline value as the input. The baseline value may indicate a threshold value related to each initiative. The baseline value may be associated with the at least one initiative of the one or more initiatives. In one aspect, the initiatives may be assigned with different baseline values.

For an example, the baseline value may be a score belonging to a range of 1-10. Post selecting the initiative and receiving the input by the user, the system 102 may compute the effectiveness score for the initiative. In one embodiment, the effectiveness score may be computed as below:

$$\text{Effectiveness score} = (\text{Defect count}/\text{Total effort}) * 100 \quad (2)$$

Figure 9:
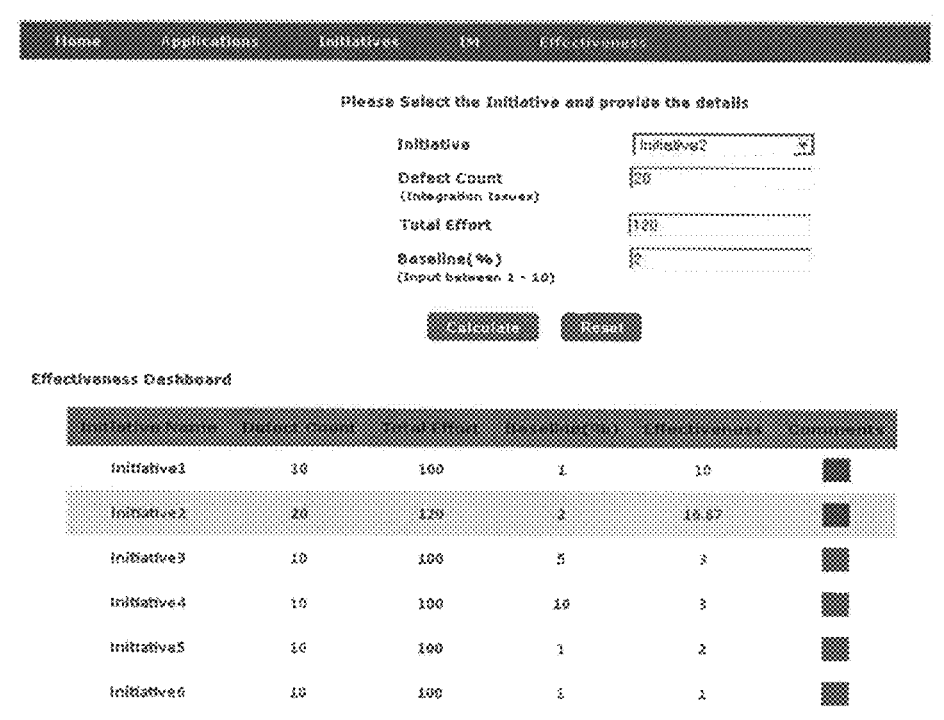

In an example, referring to the FIG. 9, the user may select the initiative 2. The baseline value may be set as 2. Further, the user may input the defect count as 20 and total effort as 120. The system 102 may then compute the effectiveness score as 16.67. The system 102 may compare the effectiveness score with the baseline value. In current situation, the effectiveness score has a value greater than the baseline value. The situation may indicate that expectations related to the initiative are not fulfilled. A converse of the situation may also stand true in a case. In one aspect, the system 102 may illustrate the initiative, input by the user and the effectiveness score in different visual formats like graphs, pie charts, or tables.

Upon a successful development of the applications, the system 102 may suggest the user of a type of integration technique to be used for integrating the applications. The system 102 may suggest the integration technique based on a technology or the programming language used for development of the applications. For example, one application may be developed using Java™ and another application may be developed using a legacy mainframe. In a case both of the applications may require a real-time interaction amongst each other. The system 102 may suggest MQ as the interaction technique to be used during the case.

Thus, the system 102 may allow the user to monitor the one or more quality control activities to be performed during development of a software application in an above described manner.

Figure 10:
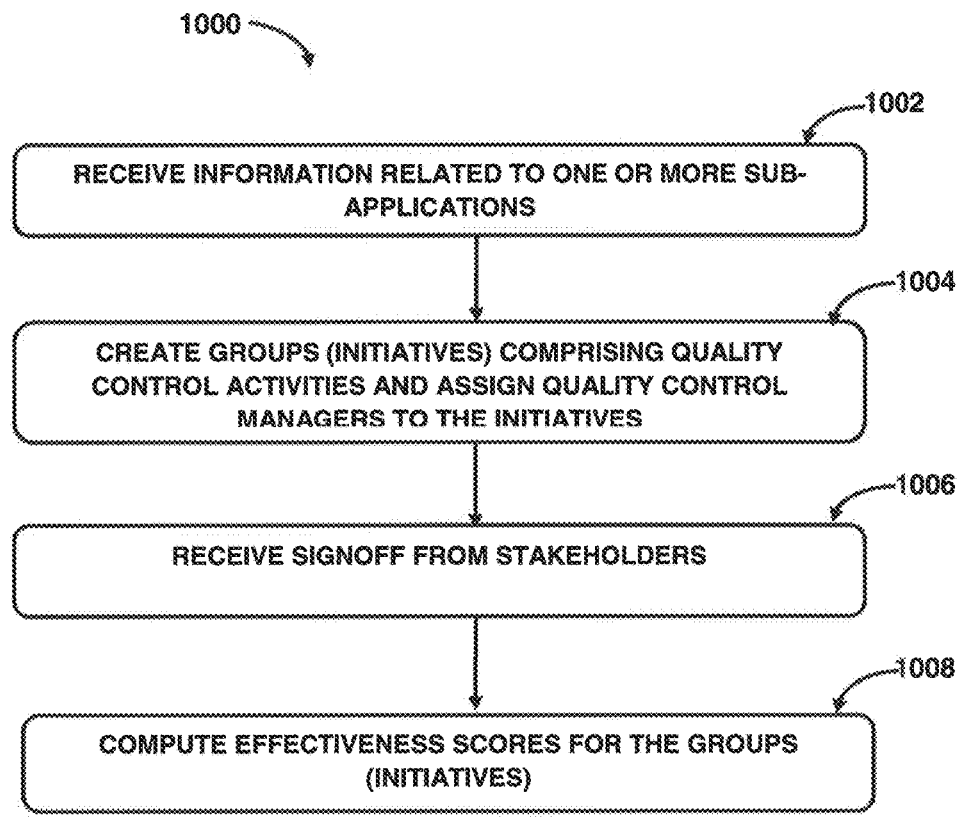
FIG. 10 illustrates a method for monitoring the one or more quality control activities to be performed during development of the IT application, in accordance with an embodiment of the present disclosure.

Referring now to FIG. 10, a method 1000 for monitoring one or more quality control activities to be performed during development of a software application is shown, in accordance with an embodiment of the present disclosure. The method 1000 may be described in the general context of computer executable instructions. Generally, computer executable instructions can include routines, programs, objects, components, data structures, procedures, modules, functions, etc., that perform particular functions or implement particular abstract data types. The method 1000 may be practiced in a distributed computing environment where functions are performed by remote processing devices that are linked through a communications network. In a distributed computing environment, computer executable instructions may be located in both local and remote computer storage media, including memory 112 storage devices.

The order in which the method 1000 is described is not intended to be construed as a limitation, and any number of the described method blocks can be combined in any order to implement the method 1000 or alternate methods. Additionally, individual blocks may be deleted from the method 1000 without departing from the spirit and scope of the disclosure described herein. Furthermore, the method can be implemented in any suitable hardware, software, firmware, or combination thereof. However, for ease of explanation, in the embodiments described below, the method 1000 may be considered to be implemented in the above described in the system 102.

At block 1002, information related to one or more sub-applications may be received by the system 102. Each sub-application may correspond to a module of the software application.

At block 1004, one or more groups may be created. The one or more groups may comprise one or more quality control activities to be performed. The one or more quality control activities may be performed during different stages of development of the software application. Further, the one or more groups may be related to the one or more sub-applications. The one or more groups may also be referred as initiatives. Simultaneously while creating the initiatives, quality control managers may be assigned to the initiatives. The quality control manager may monitor the one or more quality control activities. The quality control manager may track a progress of the one or more quality control activities based on a planned start date, a planned end date, an actual start date, and an actual end date related to the one or more quality control activities.

At block 1006, signoff from at least one stakeholder may be received. The signoff may indicate a completion of the one or more quality control activities to be performed during different stages of development of the software application. The different stages of development of the software application may comprise a design stage, a build phase, a test phase, and a control phase.

At block 1008, effectiveness scores related to the initiatives may be computed. The effectiveness scores may be computed based on a defect count, total effort applied for resolving the integration issues, and a baseline percentage related to an initiative of the one or more initiatives.

Although implementations of methods and systems for monitoring the one or more quality control activities to be performed during development of an software application have been described in language specific to structural features and/or methods, it is to be understood that the appended claims are not necessarily limited to the specific features or methods described. Rather, the specific features and methods are disclosed as examples of implementations for facilitating the quality assurance of the software application.

Exemplary embodiments discussed above may provide certain advantages. Though not required to practice aspects of the disclosure, these advantages may include those provided by the following features.

Some embodiments may enable a system and a method to identify quality control managers responsible for monitoring the one or more quality control activities to be performed for a successful integration of a software application.

Some embodiments may enable a system and a method to define one or more quality control activities to be performed.

Some embodiments may enable a system and a method to monitor the one or more quality control activities based on a start date and an end date associated with the one or more quality control activities.

Some embodiments may enable a system and a method to receive a signoff from stakeholders. The signoff may indicate a completion of the one or more quality control activities.

The invention claimed is:

1. A method for monitoring plurality of quality control activities to be performed during development of a software application, the method comprising:
   receiving, by a hardware processor, information pertaining to one or more sub-applications stored in a memory, wherein the one or more sub-applications are integrated to derive the software application, and wherein each sub-application corresponds to a module of the software application;
   creating, using the hardware processor, one or more groups based on the received information, such that each of the one or more groups is associated with at least one of the one or more sub-applications, wherein each group comprises the plurality of quality control activities to be performed during different stages of development of the software application such that the different stages comprise a design stage, a build stage, a test stage, and a control stage, and wherein each quality control activity is associated with a start date and an end date;
   assigning, using the hardware processor, a quality control manager from a plurality of employees, corresponding to each group, such that the quality control manager is assigned using at least one preference wherein the at least one preference selected from a group of, number of years of experience of each of the plurality of employees, number of projects handled by each of the plurality of employees, and programming language certifications of each of the plurality of employees;

integrating the one or more sub-applications to develop the software application in accordance with a suggested integration technique based on a technology or a programming language used for the development of the software application, wherein the quality control manager observes integration issues, and addresses the integration issues by identifying mapping errors and providing a technical remedy for resolving the integration issues; and calculating, using the hardware processor, an effectiveness score related to each sub-application of the quality control activities stored in the memory upon addressing the integration issues, wherein the effectiveness score is calculated by (defect count/total effort)*100, wherein the defect count is associated to the integration of the one of more sub-applications, and wherein the total effort indicates efforts applied for resolving at least one defect, and comparing the effectiveness score with a baseline value, wherein the baseline indicates a threshold value related to each sub-application, and wherein comparing the effectiveness score with the baseline value results in a situation indicating one of:

expectations related to the sub-application are not fulfilled if the effectiveness score is greater than the baseline value; and expectations related to the sub-application are fulfilled if the effectiveness score is lesser than the baseline value, wherein the effectiveness score is illustrated in visual formats.

2. The method of claim 1, wherein the plurality of quality control activities are associated with one or more sub-applications, and wherein the one or more sub-applications are integrated to develop the software application.

3. The method of claim 1, further comprising receiving, by the hardware processor, a signoff from at least one stakeholder, wherein the signoff indicates completion of the quality control activities to be performed during the different stages of development of the software application by the quality control manager.

4. A system implemented on a server for monitoring plurality of quality control activities to be performed during development of a software application, the system comprises:

a hardware processor;

a memory coupled to the hardware processor, wherein the hardware processor is capable for executing programmed instructions stored in the memory to:

receive, by a hardware processor, information pertaining to one or more sub-applications stored in the memory, wherein the one or more sub-applications are integrated to derive the software application, and wherein each sub-application corresponds to a module of the software application;

create, using the hardware processor, one or more groups based on the received information, such that each of the one or more groups is associated with at least one of the one or more sub-applications, wherein each group comprises the plurality of quality control activities to be performed during different stages of development of the software application such that the different stages comprise a design stage, a build stage, a test stage, and a control stage, and wherein each quality control activity is associated with a start date and an end date;

assign, using the hardware processor, a quality control manager from a plurality of employees, corresponding to each group, such that the quality control manager is assigned using at least one preference wherein the at least one preference selected from a group of, number of years of experience of each of the plurality of employees, number of projects handled by each of the plurality of employees, and programming language certifications of each of the plurality of employees;

integrate the one or more sub-applications to develop the software application in accordance with a suggested integration technique based on a technology or a programming language used for the development of the software application, wherein the quality control manager observes integration issues, and addresses the integration issues by identifying mapping errors and providing a technical remedy for resolving the integration issues; and calculate an effectiveness score related to each sub-application of the quality control activities stored in the memory upon addressing the integration issues, wherein the effectiveness score is calculated by (defect count/total effort)*100, wherein the defect count is associated to the integration of the one of more sub-applications, and wherein the total effort indicates efforts applied for resolving at least one defect and compare the effectiveness score with a baseline value, wherein the baseline indicates a threshold value related to each sub-application, and wherein comparing the effectiveness score with the baseline value results in a situation indicating one of:

expectations related to the sub-application are not fulfilled if the effectiveness score is greater than the baseline value; and expectations related to the sub-application are fulfilled if the effectiveness score is lesser than the baseline value, wherein the effectiveness score is illustrated in visual formats.

5. The system of claim 4, wherein the plurality of quality control activities are associated with one or more sub-applications, and wherein the one or more sub-applications are integrated to develop the software application.

6. The system of claim 4, wherein the hardware processor is further capable for executing programmed instructions stored in the memory to:

receive a signoff from at least one stakeholder, wherein the signoff indicates completion of the quality control activities to be performed during the different stages of development of the software application by the quality control manager.

7. A non-transitory computer readable medium embodying a program executable by a hardware processor for monitoring plurality of quality control activities to be performed during development of an software application, the program comprising program code for:

receiving, by a hardware processor, information pertaining to one or more sub-applications stored in a memory, wherein the one or more sub-applications are integrated to derive the software application, and wherein each sub-application corresponds to a module of the software application, creating, using the hardware processor, one or more groups based on the received information, such that each of the one or more groups is associated with at least one of the one or more sub-applications, wherein each group comprises the plurality of quality control activities to be performed during different stages of development of the software application such that the different stages comprise a design stage, a build stage, a test stage, and a control stage, and wherein each quality control activity is associated with a start date and an end date;

assigning, using the hardware processor, a quality control manager from a plurality of employees, corresponding to each group, such that the quality control manager is assigned using at least one preference wherein the at least one preference selected from a group of, number of years of experience of each of the plurality of employees, number of projects handled by each of the plurality of employees, and programming language certifications of each of the plurality of employees;

integrating the one or more sub-applications to develop the software application in accordance with a suggested integration technique based on a technology or a programming language used for the development of the software application, wherein the quality control manager observes integration issues while integrating the sub-applications, and addresses the integration issues by identifying mapping errors and providing a technical remedy for resolving the integration issues; and calculating, using the hardware processor, an effectiveness score related to each sub-application of the quality control activities stored in the memory upon addressing the integration issues, wherein the effectiveness score is calculated by (defect count/total effort)*100, wherein the defect count is associated to the integration of the one of more sub-applications, and wherein the total effort indicates efforts applied for resolving at least one defect and comparing the effectiveness score with a baseline value wherein the baseline indicates a threshold value related to each sub-application, and wherein comparing the effectiveness score with the baseline value results in a situation indicating one of:

expectations related to the sub-application are not fulfilled if the effectiveness score is greater than the baseline value; and expectations related to the sub-application are fulfilled if the effectiveness score is lesser than the baseline value, wherein the effectiveness score is illustrated in visual formats.

* * * * *